(12) United States Patent
Kobayashi

(10) Patent No.: US 6,987,617 B2
(45) Date of Patent: Jan. 17, 2006

(54) DIFFRACTING OPTICAL ELEMENT, AND OPTICAL SYSTEM AND OPTICAL APPARATUS HAVING THE SAME

(75) Inventor: Shuichi Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/093,161

(22) Filed: Mar. 6, 2002

(65) Prior Publication Data

US 2002/0163725 A1 Nov. 7, 2002

(30) Foreign Application Priority Data

Mar. 6, 2001 (JP) .............................. 2001-062028

(51) Int. Cl.
*G02B 5/18* (2006.01)
(52) U.S. Cl. ....................... 359/576; 359/569; 359/566
(58) Field of Classification Search ................. 359/576, 359/569, 558, 566
See application file for complete search history.

(56) References Cited

U.S. PATENT DOCUMENTS

| 5,013,141 A | * | 5/1991 | Sakata ........................ 349/201 |
|---|---|---|---|
| 5,048,925 A | * | 9/1991 | Gerritsen et al. ........... 359/569 |
| 5,299,037 A | * | 3/1994 | Sakata ............................ 349/1 |
| 5,847,877 A | | 12/1998 | Imamura et al. ............. 359/566 |
| 6,122,104 A | | 9/2000 | Nakai .......................... 359/576 |
| 6,157,488 A | * | 12/2000 | Ishii ............................ 359/569 |
| 6,560,019 B2 | | 5/2003 | Nakai .......................... 359/569 |
| 2002/0036827 A1 | * | 3/2002 | Nakai .......................... 359/565 |

FOREIGN PATENT DOCUMENTS

| DE | 195 33 591 A1 | 9/1995 |
|---|---|---|
| EP | 0 898 182 A2 | 2/1999 |
| EP | 0 898 182 A3 | 2/1999 |
| EP | 1 193 512 A2 | 4/2002 |
| JP | 9-127322 | 5/1997 |

* cited by examiner

*Primary Examiner*—Thong Nguyen
*Assistant Examiner*—Arnel C. Lavarias
(74) *Attorney, Agent, or Firm*—Morgan & Finnegan, LLP

(57) ABSTRACT

A diffracting optical element has a structure that a plurality of layers having a periodic relief pattern varying in height in a period are laminated in proximity to or close contact with each other. The diffracting optical element includes two layers equal in the height of the relief pattern and opposite to each other in the direction in which the height of the relief pattern varies in a period, and another layer differing in the height of the relief pattern from the two layers. Materials forming the three layers differ in dispersion from one another.

19 Claims, 10 Drawing Sheets

DIFFRACTING OPTICAL ELEMENT, AND OPTICAL SYSTEM AND OPTICAL APPARATUS HAVING THE SAME

BACKGROUND OF THE INVENTION

1. Field of the Invention

This invention relates to a diffracting optical element, and an optical system, a photographing apparatus and an observation apparatus having the diffracting optical element, and particularly to a diffracting optical element for use in a wavelength area relatively having a band width such as a visible light area.

2. Related Background Art

As the features of a diffracting optical element, mention may be made of the following:

(1) In contrast with a refracting optical system having power of the same sign, the way in which chromatic aberration reveals itself is converse.

(2) By changing the pitch of the relief pattern of a diffraction grating constituting the diffracting optical element, a wave front can be controlled.

(3) The relief pattern is of very thin structure and is therefore small in occupied volume.

Particularly regarding item (1) above, if the diffracting optical element is introduced into what is generally comprised of a refracting optical system such as a camera lens, chromatic aberration will be greatly improved.

Further, by item (2) above, the effect of introducing a so-called aspherical lens into an optical system can also be obtained.

Furthermore, by adding item (3) above, there can be realized a compact optical system having good optical performance.

Such techniques are disclosed in literature such as SPIE Vol. 1354, International Lens Design Conference (1990), Japanese Patent Application Laid-Open No. 4-213421 (corresponding U.S. Pat. No. 5,044,706), Japanese Patent Application Laid-Open No. 6-324262 (corresponding U.S. Pat. No. 5,790,321), etc.

FIG. 1 of the accompanying drawings shows the epitome of the conventional most popular diffracting optical element. As shown in FIG. 1, a relief pattern 101 is formed on the boundary between an air layer 102 and a resin material layer 103 having a refractive index Nd=1.497 and an Abbe number νd=57.44. The height of this relief pattern 101 is represented by h, and the pitch thereof is represented by P. Such a diffracting optical element comprised of a diffraction grating will hereinafter be called a single-layer diffracting optical element.

When P=150 μm and h=1.05 μm, the result of the calculation of the diffraction efficiency of this diffracting optical element 105 is shown in FIG. 2 of the accompanying drawings. In FIG. 2, the axis of abscissas represents the wavelength 400 nm–700 nm of a visible light area, and the axis of ordinates represents the diffraction efficiency of +first-order diffracted light. This diffracting optical element is such that in the used wavelength area 400 nm–700 nm, +first-order is chosen as the design order at which the diffraction efficiency of diffracted light becomes highest. It is also possible to set so as to change the height of the relief of the diffracting optical element, whereby the diffraction efficiency of other order than +first-order may become highest, but there will be shown hereafter a case where +first-order is chosen as the design order and the diffraction efficiency of +first-order diffracted light becomes highest.

According to FIG. 2, in the visible area, diffraction efficiency lowers greatly in the short wavelength side and long wavelength side wavelength areas. In these wavelength areas, the diffraction efficiency of other unnecessary orders (not shown) than +first-order becomes high. When such a diffracting optical element is applied to an optical system such as a camera lens used in the visible light area, the unnecessary orders may cause flare.

When the height of the diffracting optical element is defined as h and the refractive index thereof in a certain wavelength λ is defined n(λ), the optical path difference OPD occurring between it and the air (refractive index 1) is $$OPD=(n(\lambda)-1)\cdot h.$$

The diffraction efficiency at this time is $$\eta = \left[\frac{\sin(\pi \cdot x)}{\pi \cdot x}\right]^2$$

where $$x=(OPD/\lambda)-m$$

and now the design order is +first-order and therefore m=1. The diffraction efficiency η becomes highest when $$x=0$$

FIG. 3 of the accompanying drawings shows the value (phase characteristic) of x of the diffracting optical element in FIG. 1 (m=1). The value of x deviates greatly from 0 on the short wavelength side and the long wavelength side and therefore assumes the characteristic as shown in FIG. 2.

The technique of eliminating the wavelength dependency of the diffraction efficiency of such a diffracting optical element, and preventing the occurrence of flare or the like is disclosed in applicant's (or assignee's) Japanese Patent Application Laid-Open No. 11-223717 (corresponding U.S. Application Laid-Open No. 2001015848), or in Japanese Patent Application Laid-Open No. 9-325203 (corresponding U.S. Pat. No. 6,157,488) or Japanese Patent Application Laid-Open No. 9-127322 (corresponding U.S. Pat. No. 6,157,488). These aim to construct a diffracting optical element by combining two or more kinds of materials differing in optical characteristic, and reduce the wavelength dependency of diffraction efficiency.

FIG. 4 of the accompanying drawings shows an example of the construction of a diffracting optical element described in an embodiment in Japanese Patent Application Laid-Open No. 11-223717. A laminated type diffracting optical element will hereinafter be described by the use of this example of the construction. In FIG. 4, a laminated type diffracting optical element 111 is formed by a relief pattern 106 constructed between an optical material layer 109 in which Nd=1.635 and νd=22.99 and an air layer 108, and a relief pattern 107 constructed between an optical material layer 110 in which Nd=1.5129 and νd=51.00 and the air layer 108. The heights h1 and h2 of the relief pattern 106 and the relief pattern 107, respectively, are h1=−7.88 μm and h2=10.95 μm. The reason why h1 is given the minus sign is that the direction of grating structure forming the diffracting optical element is opposite to that of h2.

In this example of the construction, the relation between the aforementioned x and the wavelength is shown in FIG. 5 of the accompanying drawings. Also, FIG. 6 of the accompanying drawings shows the wavelength dependency of the diffraction efficiency of the first-order light of the laminated type diffracting optical element shown in FIG. 4, and in FIG. 6, as compared with FIG. 2, the diffraction efficiency of the short wavelength side and the long wavelength side is greatly improved. However, it will be seen that in the short wavelength side area, there is a reduction in diffraction efficiency.

FIG. 7 of the accompanying drawings shows the refractive indices of two optical materials forming the diffracting optical element in FIG. 4. In FIG. 7, dotted line and solid line represent the refractive indices, respectively, of the materials forming layers 109 and 110. A change in the refractive index of the material forming the layer 109 on the short wavelength side thereof is great and therefore, the change in x on the short wavelength side in FIG. 5 is great. This is the cause of the reduction in the diffraction efficiency on the short wavelength side.

As previously described, as compared with the single-layer type diffracting optical element, the diffraction efficiency of this laminated type diffracting optical element is greatly improved, but there is still a reduction in diffraction efficiency on the short wavelength side. This may cause flare and therefore, the achievement of a diffracting optical element which is high in diffraction efficiency in the whole of a wavelength area used is desired.

SUMMARY OF THE INVENTION

The present invention has as its object to provide a diffracting optical element which can maintain extensively good diffraction efficiency in a wide wavelength band used such as a visible light area.

In order to achieve the above object, a diffracting optical element in one form of the present invention is a diffracting optical element in which a plurality of layers having a periodic relief pattern varying in height in a period are laminated in proximity to or close contact with each other, characterized by the provision of two layers equal in the height of the relief pattern and opposite to each other in the direction in which the height of the relief pattern varies in a period, and another layer differing in the height of the relief pattern from the two layers, and in that materials forming the three layers differ in dispersion from one another.

Also, a diffracting optical element in another form of the present invention is a diffracting optical element in which likewise a plurality of layers having a periodic relief pattern varying in height in a period are laminated in proximity to or close contact with each other, characterized by the provision of two layers formed of materials differing in dispersion from each other, and equal in the height of the relief pattern and opposite to each other in the direction in which the height of the relief pattern varies in a period, and another layer being the same as one of the two layers which is formed of a material smaller in dispersion in the direction in which the height of the relief pattern varies in a period, and in that the material forming the another layer is greater in dispersion than both of the materials forming the two layers.

DESCRIPTION OF THE PREFERRED EMBODIMENTS

Some embodiments of the present invention will hereinafter be described.

(Embodiment 1)

Figure 8:
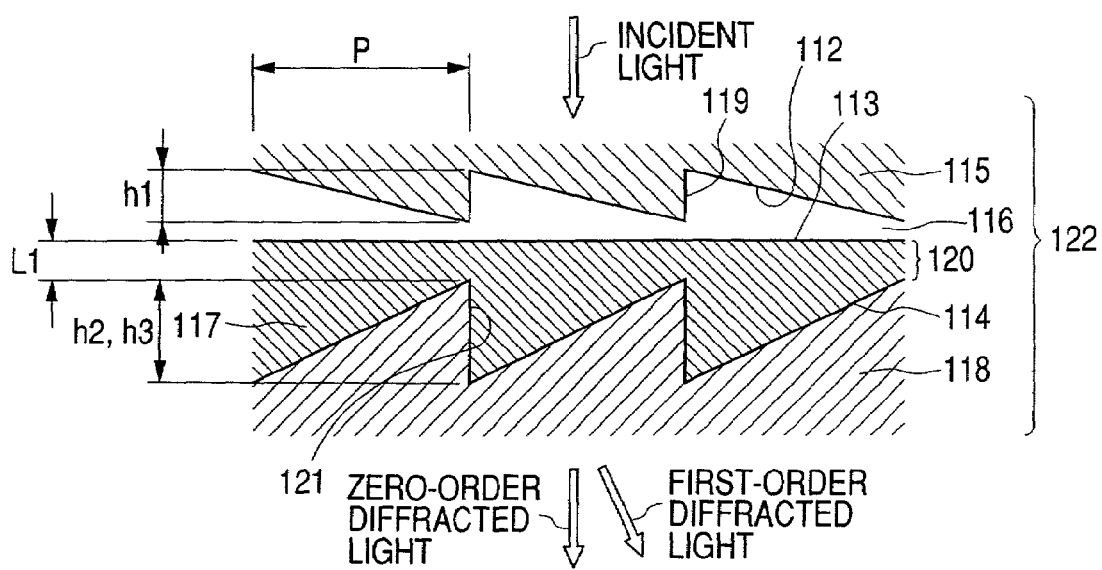
FIG. 8 shows a diffracting optical element according to Embodiment 1.

FIG. 8 is a cross-sectional view of the main structure of a diffracting optical element 122 according to Embodiment 1 of the present invention. Light enters the element from the direction of upper arrow, travels through a first material layer (first layer) 115, an air layer (a layer of which the refractive index is 1) 116, a second material layer (second layer) 117 and a third material layer (third Layer) 118 in the named order, and emerges from the diffracting optical element. A minute relief pattern 112 of which the height varies in a period is formed between the first material layer 115 and the air layer 116, and a minute relief pattern 114 varying in height in a period is formed between the second material layer 117 and the third material layer 118. The relief patterns of the second material layer and the third material layer are opposite to each other in the direction of the variation in the height in a period and are equal in height and therefore, the two relief patterns are of such structure that they just fit together. The material layer 115 is formed of a resin material in which Nd=1.636 and νd=22.80, the material layer 117 is formed of a resin material in which Nd=1.598 and νd=27.99, and the material layer 118 is formed of a resin material in which Nd=1.513 and νd=51.00. Thus, the respective layers have different dispersions from one another in the visible-band. The height (depth) of the relief pattern of the first material layer 115 is h1=3.538 $\mu$m, the height of the second relief pattern is h2=−19.5 $\mu$m, and the height of the third relief pattern is h3=−h2=19.5 $\mu$m. The reason why h2 is given the minus sign is that the direction of the variation in the height in the cross-sectional shape is opposite to that of h1 and h3. In FIG. 8, the grating shape in the first and third layers is such that the height of the grating portion of a period becomes smaller from the right to the left as viewed in the figure, but the second layer is opposite to it.

Figure 1:
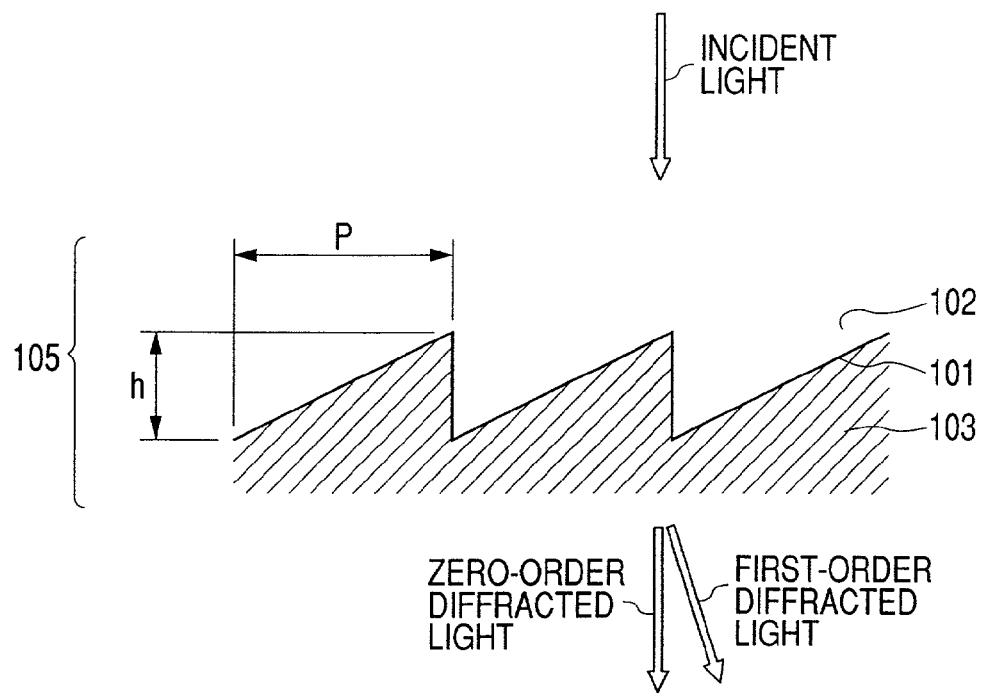
FIG. 1 shows a single-layer type diffracting optical element according to the prior art.
Figure 2:
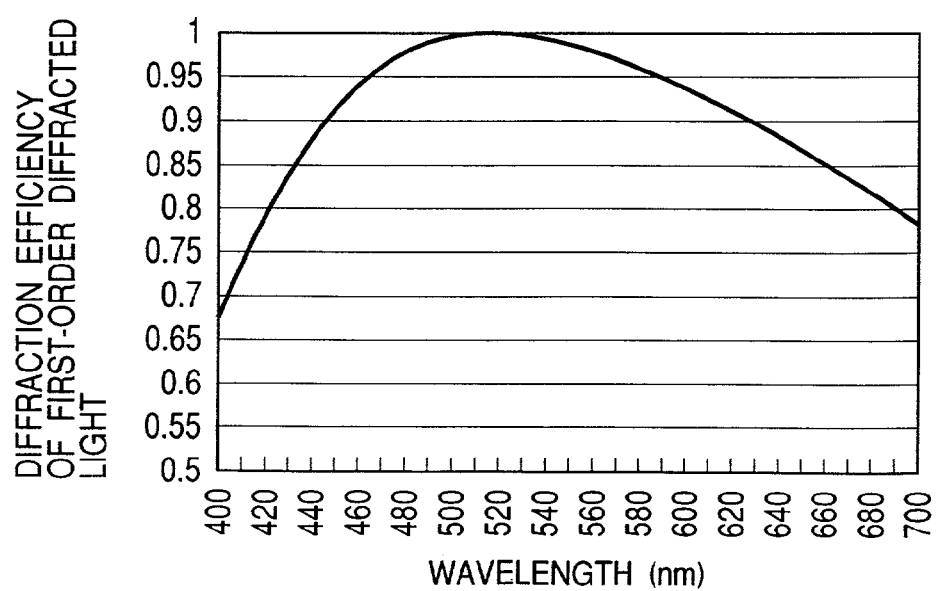
FIG. 2 shows the diffraction efficiency of the single-layer type diffracting optical element according to the prior art.
Figure 3:
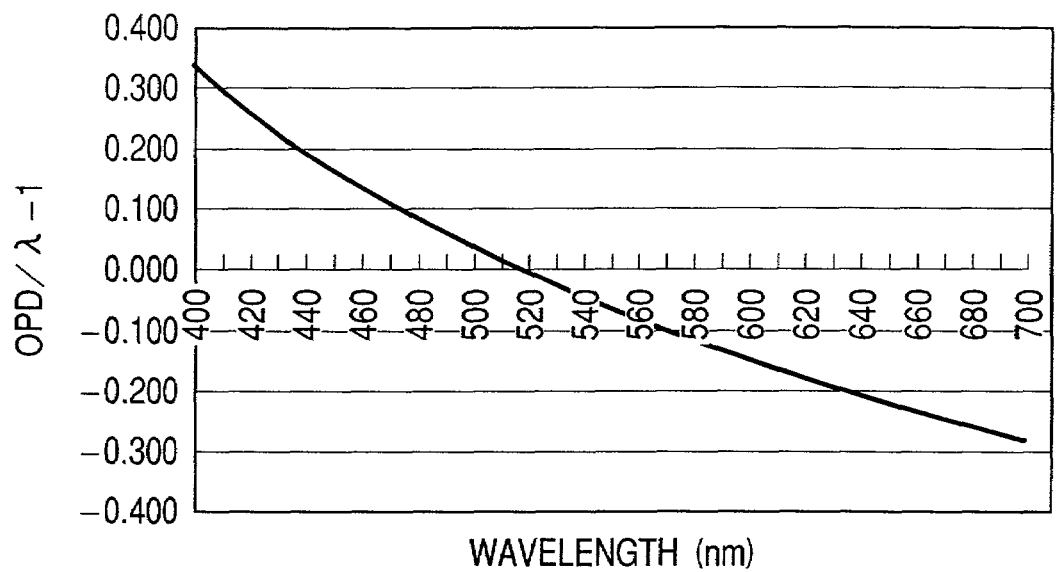
FIG. 3 shows the phase characteristic of the single-layer type diffracting optical element according to the prior art.
Figure 4:
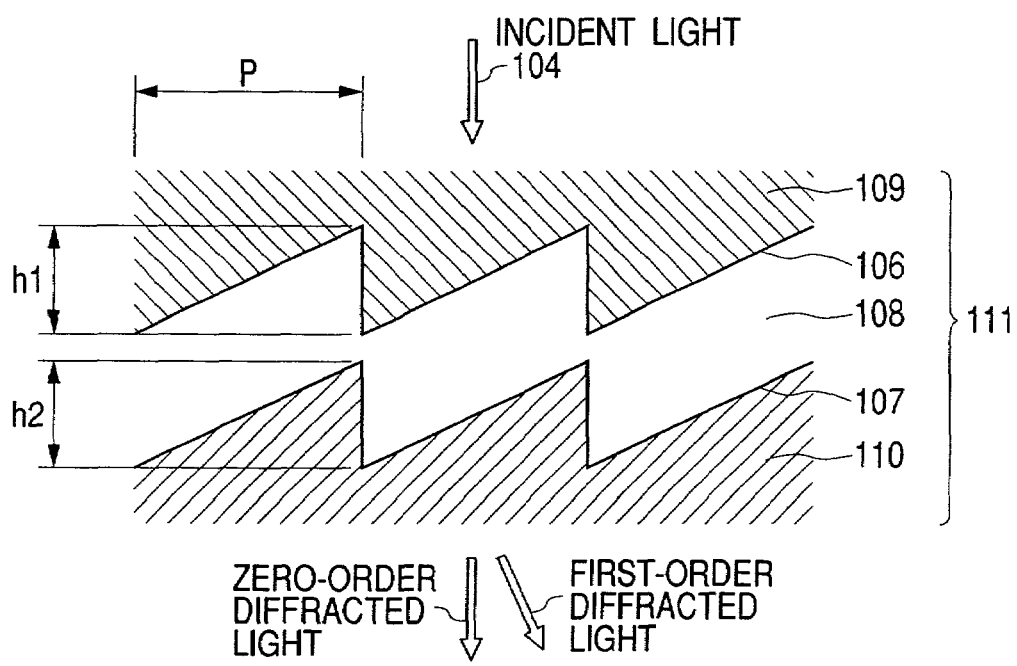
FIG. 4 shows a laminated type diffracting optical element according to the prior art.
Figure 5:
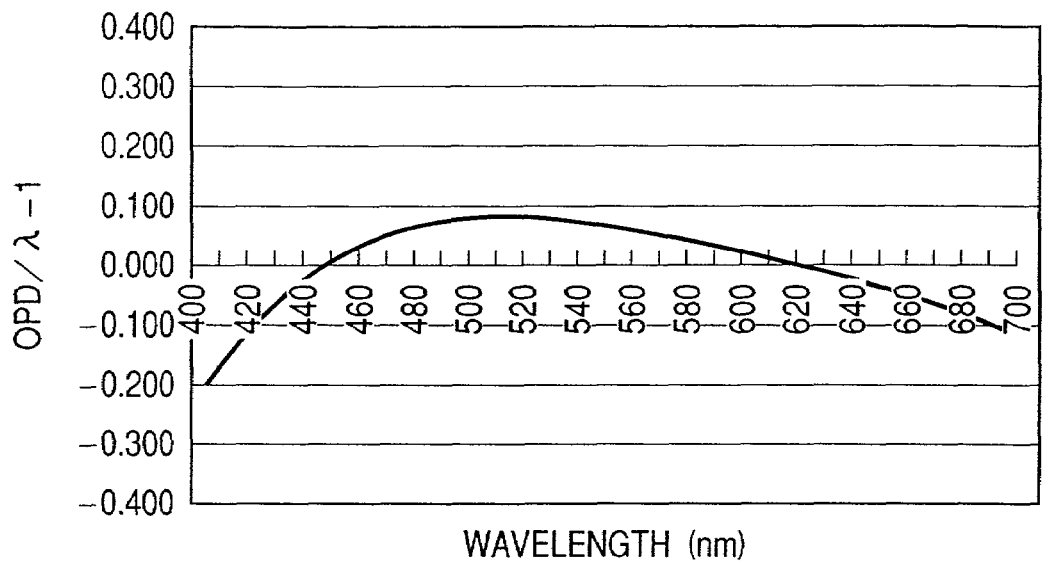
FIG. 5 shows the phase characteristic of the laminated type diffracting optical element according to the prior art.
Figure 6:
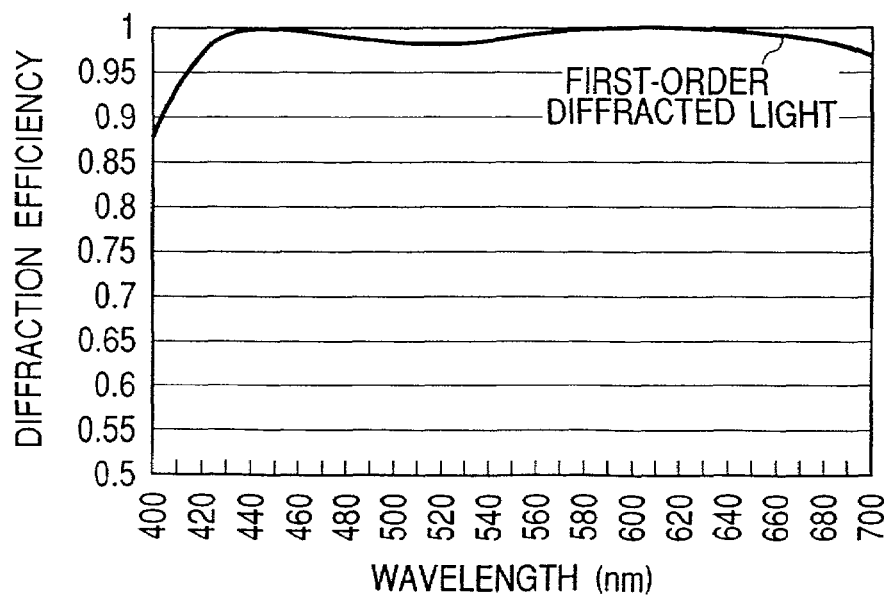
FIG. 6 shows the diffraction efficiency of the laminated type diffracting optical element according to the prior art.
Figure 7:
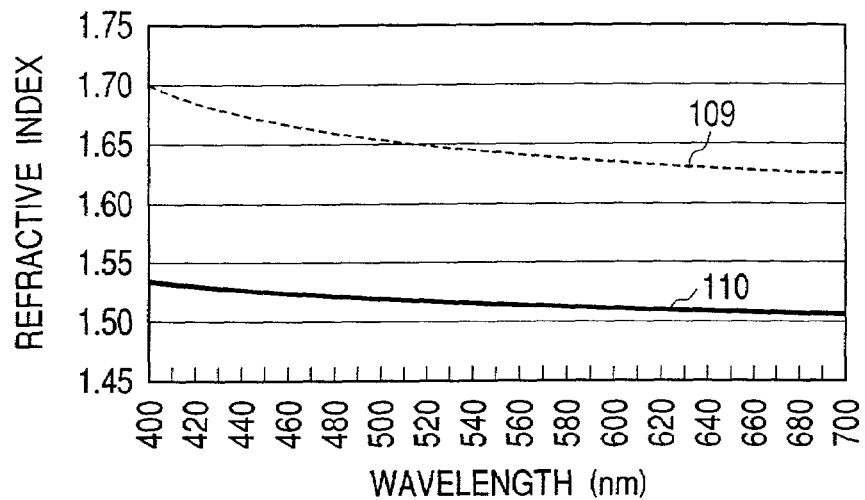
FIG. 7 shows the characteristics of materials forming the laminated type diffracting optical element according to the prior art.
Figure 9:
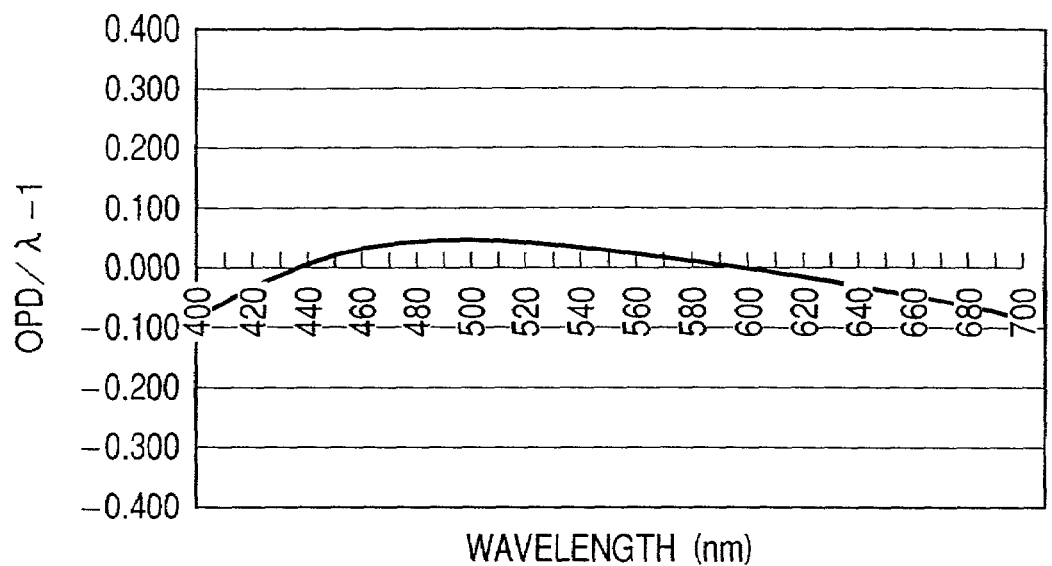
FIG. 9 shows the phase characteristic of the diffracting optical element according to Embodiment 1.
Figure 10:
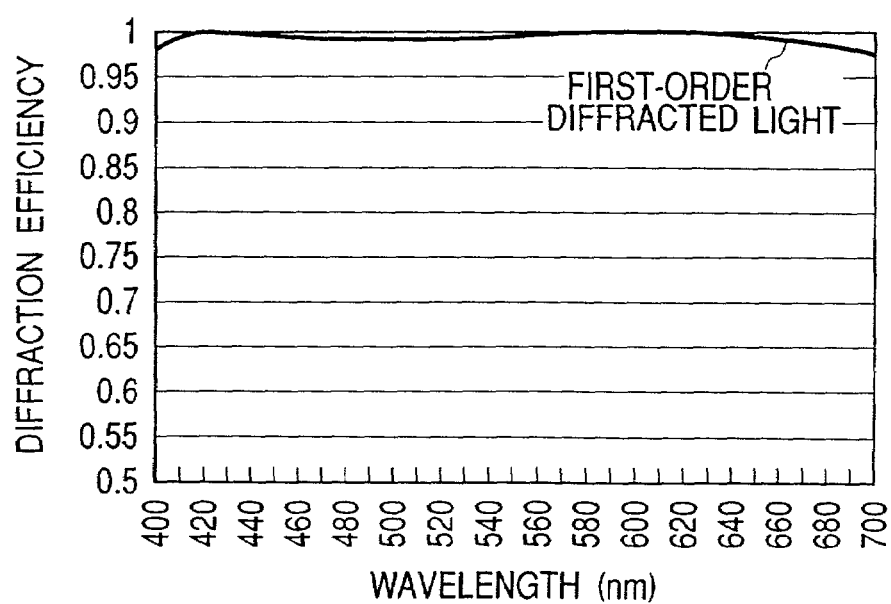
FIG. 10 shows the diffraction efficiency of the diffracting optical element according to Embodiment 1.

FIG. 9 shows the aforedescribed x(OPD/λ−1) in this construction. FIG. 10 shows the wavelength dependency of the diffraction efficiency of the present embodiment. Comparing FIG. 9 with FIG. 5 which shows an example of the prior art, it will be seen that the variation in OPD/λ−1 for wavelength is small in the diffracting optical element of the present embodiment, and as the result, there can be achieved the characteristic of diffraction efficiency greater than that of the conventional diffracting optical element of laminated structure, as shown in FIG. 10, particularly high diffraction efficiency in the short wavelength area.

Figure 11:
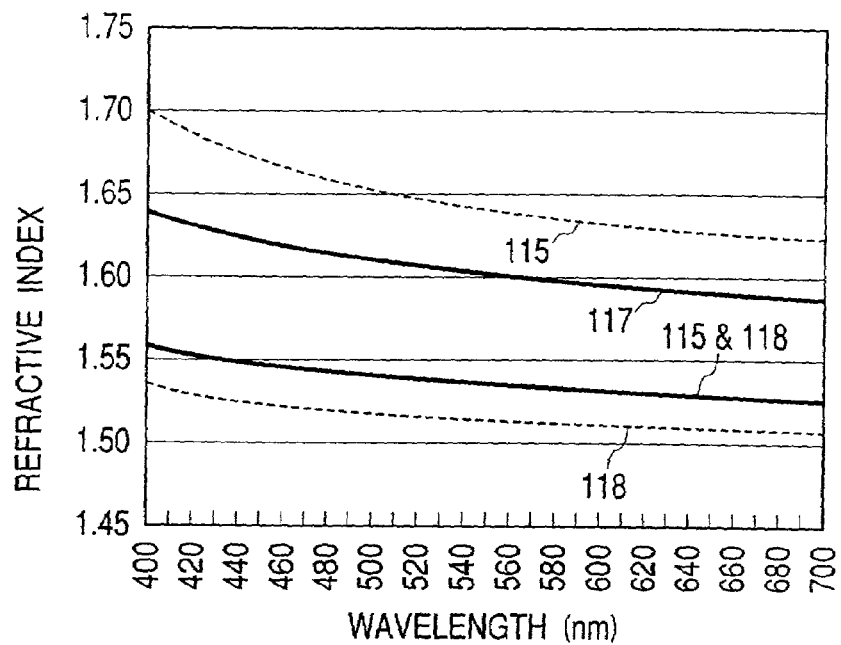
FIG. 11 shows the characteristics of materials forming the diffracting optical element according to Embodiment 1.

FIG. 11 shows the refractive indices of the respective material layers 115, 117 and 118. Numbers indicated in the graph of FIG. 11 correspond to the respective material layers. As regards what is indicated as 115 & 118, the material layers 115 and 118 are formed by relief patterns of heights h1 and h3, respectively, but it being assumed that they are formed with a height of (h1+h3), the equivalent refractive index of the two relief patterns has been calculated. That is, the laminated optical element of Embodiment 1 having three-layer structure can be regarded as a laminated type diffracting optical element formed of two materials, i.e., a material 115 & 118 and a material 117.

By using a material like 115 which is great in the variation in refractive index by a wavelength variation on the short wavelength side, the dispersion characteristic of the equivalent refractive index can be appropriately controlled. Such correction becomes possible by establishing the relation that

ν1<ν2<ν3 when the Abbe numbers of the material layers 115, 117 and 118 are defined as ν1, ν2 and ν3, respectively. Further, when a partial dispersion characteristic is calculated from FIG. 11 and the partial dispersion ratios $\theta_{g,F}$ of the material layers 115, 117 and 118 are defined as θ1, θ2 and θ3, respectively, θ1=0.697, θ2=0.595 and θ3=0.560, whereby

θ1>θ2>θ3.

By thus choosing the arrangement of the materials, the dispersion in the short wavelength area can be controlled in spite of the height of the grating being small, and particularly the diffraction efficiency in the short wavelength area can be improved. The partial dispersion ratio $\theta_{g,F}$ is represented by $$\frac{ng - nF}{nF - nC},$$

and ng, nF and nC are the refractive indices of the material for g-line, F-line and C-line, respectively.

Also, in the present embodiment, the height of the relief pattern 112 being in contact with the air layer is as small as 4 μm or less and therefore, it becomes possible to alleviate the influence of scattering on a grating side indicated by 119 in the figure. Furthermore, the absolute values of the heights of the relief pattern 114 of the material layers 117 and 118 could be made equal to each other and therefore, it becomes possible to make a surface 113 being in contact with the air layer 116 of FIG. 8 flat, and the portion constituted by the material layers 117 and 118 can be manufactured very simply. Also, the difference in the refractive index of material between the material layers 117 and 118 is small and therefore, it becomes possible to decrease the scattering on a grating side 121 for the height of the relief pattern 114.

The diffracting optical element according to the present embodiment, as shown in FIG. 10, is small in the wavelength dependency of diffraction efficiency and is therefore effective for an optical system used in a wide band like the visible light area. Also, while in the present embodiment, only the main structure of the diffracting optical element according to the present invention is shown and therefore, as shown in FIG. 8, material layers having a plurality of relief patterns constituting the diffracting optical element are provided on a flat surface, this is not restrictive, but they can also be applied onto a curved surface or the like.

Also, while in the diffracting optical element according to the present embodiment, a material layer 120 in which no grating is formed is present between the relief pattern 114 of the second material layer 117 and the air layer 116, it is desirable that the thickness L1 be as small as possible.

In the present embodiment, there has been shown a case where the light enters from the side of the material layer 115, but the aforedescribed effect will be obtained even if the light enters from the opposite side.

Further, in the present embodiment, the materials forming the diffracting optical element are resin materials, whereby a substrate on the incidence side or the emergence side can be freely set, but this substrate is not particularly restricted. Also, the relief patterns may be formed by the substrate material itself.

(Embodiment 2)

Figure 12:
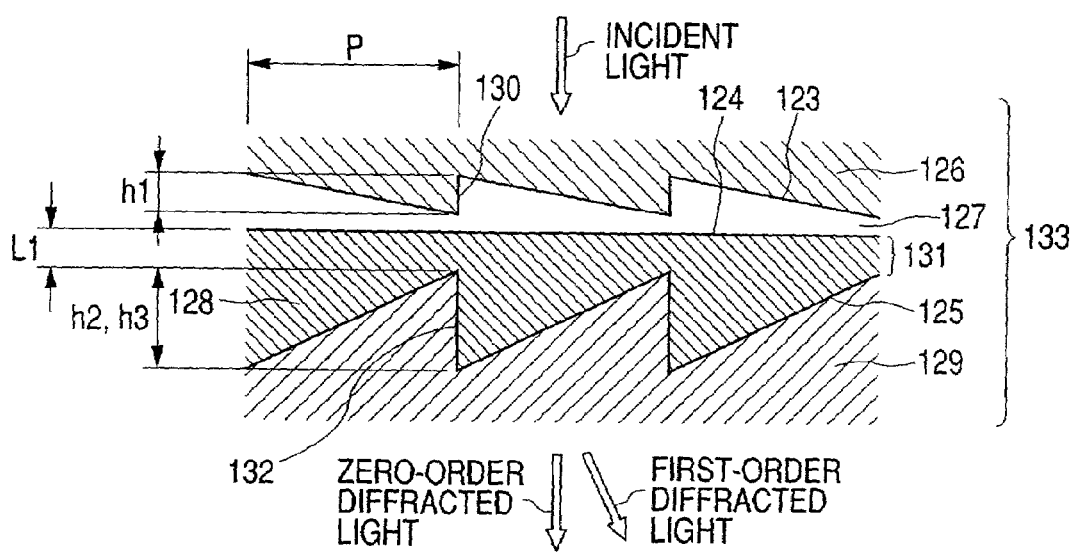
FIG. 12 shows a diffracting optical element according to Embodiment 2.

FIG. 12 is a cross-sectional view of the main structure of a diffracting optical element 133 according to Embodiment 2 of the present invention. Light enters the element from the direction of upper arrow, travels through a first material layer (first layer) 126, an air layer 127, a second material layer (second layer) 128 and a third material layer (third layer) 129 in the named order and emerges from the diffracting optical element. A minute relief pattern 123 is formed between the first material layer 126 and the air layer 127, and a minute relief pattern 125 is formed between the second material layer 128 and the third material layer 129. The material layer 126 is formed of a resin material in which Nd=1.679 and νd=19.17, the material layer 128 is formed of a resin material in which Nd=1.635 and νd=22.80, and the material layer 129 is formed of a resin material in which Nd=1.513 and νd=51.00. Thus, the respective layers have different dispersions from one another in the visible-band. The height of the relief pattern of the first material layer 126 is h1=2.784 μm, the height of the second relief pattern is h2=−10.5 μm, and the height of the third relief pattern is h3=−h2=10.5 μm.

Figure 13:
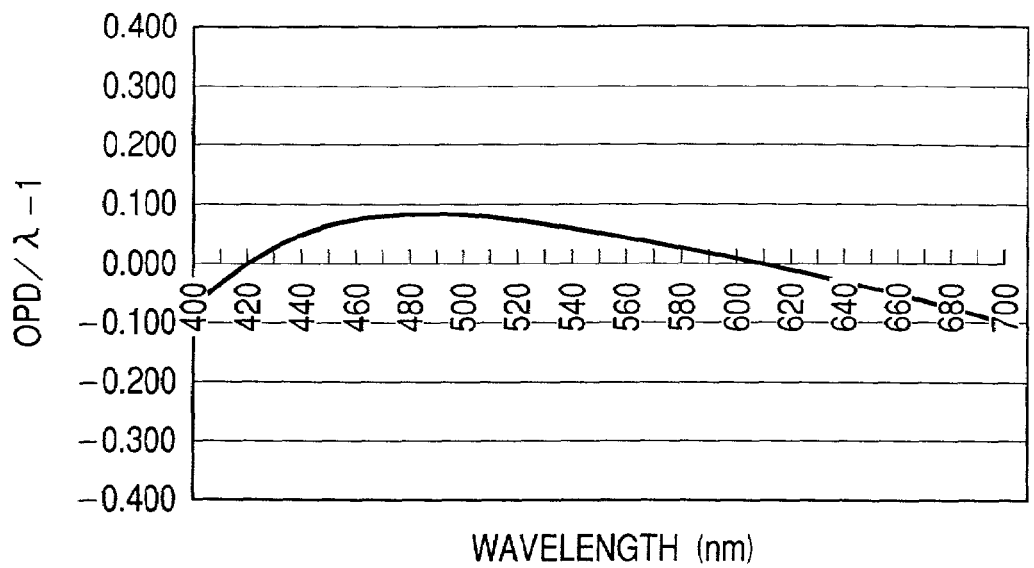
FIG. 13 shows the phase characteristic of the diffracting optical element according to Embodiment 2.
Figure 14:
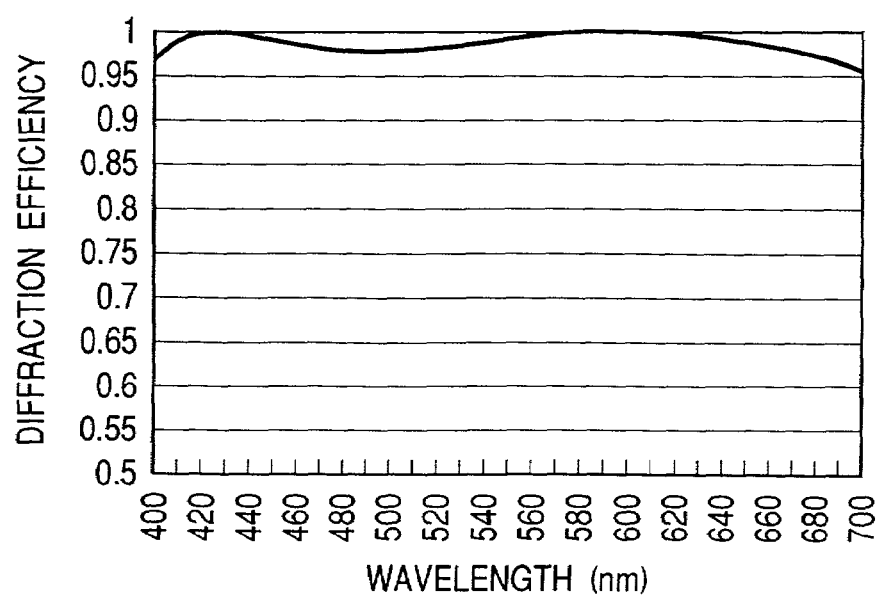
FIG. 14 shows the diffraction efficiency of the diffracting optical element according to Embodiment 2.

FIG. 13 shows the aforedescribed x(OPD/λ−1) in this construction. FIG. 14 shows the wavelength dependency of the diffraction efficiency of the present embodiment. Comparing FIG. 13 with FIG. 5, it will be seen that the variation in OPD/λ−1 for wavelength is small again in the diffracting optical element of the present embodiment, and as the result, there can be achieved a characteristic as shown in FIG. 14 wherein the wavelength dependency of diffraction efficiency is smaller than in the conventional diffracting optical element of laminated structure and therefore flare is small. Also, there can be realized a very thin diffracting optical element.

Figure 15:
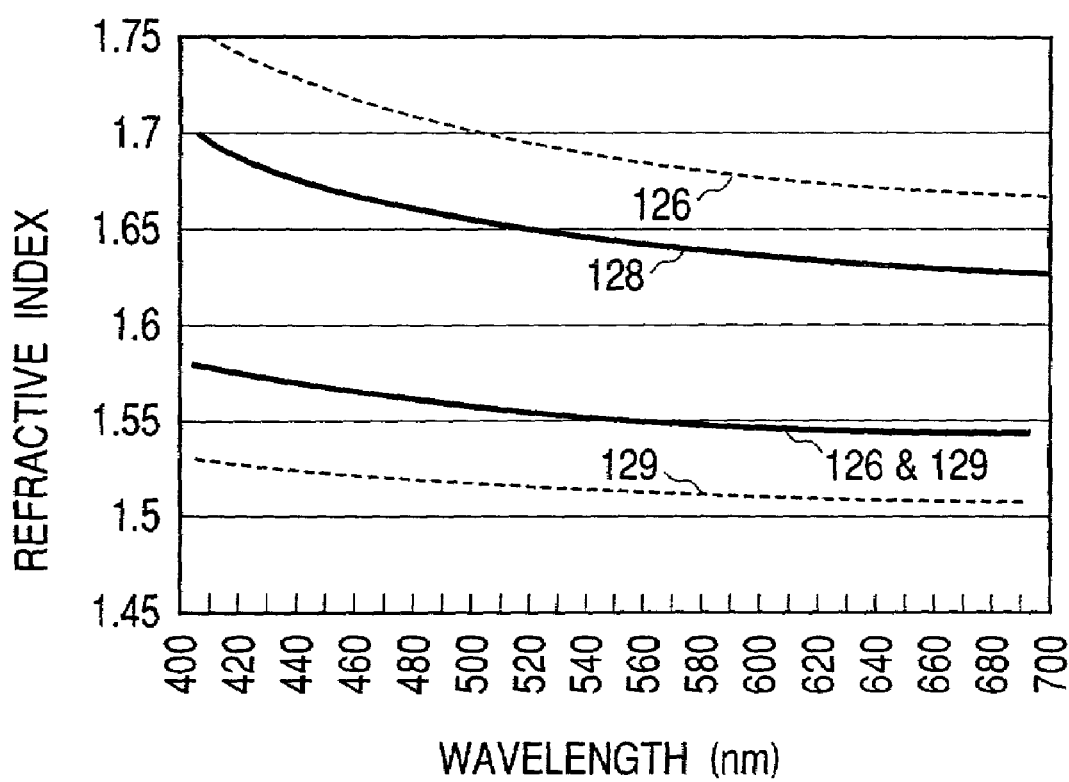
FIG. 15 shows the characteristics of materials forming the diffracting optical element according to Embodiment 2.

FIG. 15 shows the refractive indices of the respective material layers 126, 128 and 129. Numbers indicated in the graph of FIG. 15 correspond to the respective material layers. As regards what is indicated as 126 & 129, it being assumed that this is formed with a height of (h1+h3), the equivalent refractive index of two relief patterns has been calculated although the material layers 126 and 128 are formed by relief patterns having heights h1 and h3, respectively. That is, the laminated optical element of Embodiment 2 having three-layer structure can be regarded as a laminated type diffracting optical element formed of two materials, i.e., a material 126 & 129 and a material 128.

By using a material like 126 which is great in the variation in refractive index by a wavelength variation on the short wavelength side, the dispersion characteristic of the equivalent refractive index can be appropriately controlled.

Such correction becomes possible by establishing the relation that $$v1<v2<v3$$

when the Abbe numbers of the material layers 126, 128 and 129 are defined as v1, v2 and v3, respectively. Further, a partial dispersion characteristic is calculated from FIG. 11, and when the partial dispersion ratios $\theta_{g,F}$ of the material layers 126, 128 and 129 are defined as θ1, θ2 and θ3, respectively, θ1=0.70, θ2=0.697 and θ3=0.560, whereby $$\theta1>\theta2>\theta3.$$

Thereby, in spite of the height of the relief pattern being small like the material layer 126, the characteristic of the equivalent refractive index on the short wavelength side can be made proper.

Also, in the present embodiment, the height of the relief pattern 123 being in contact with the air layer is 2.784 μm, that is, as small as less than 4 μm, and therefore it becomes possible to alleviate the influence of scattering on a grating side 130. Furthermore, the absolute values of the heights of the relief pattern 125 of the material layers 128 and 129 could be made equal to each other and therefore, it becomes possible to make a surface 124 being in contact with the air layer 127 of FIG. 12 flat, and manufacture can be done very simply. Also, the difference in the refractive index of material between the material layers 128 and 129 is small and therefore, it becomes possible to decrease the scattering on a grating side 132 for the height of the relief pattern 125.

The diffracting optical element according to the present embodiment, as shown in FIG. 14, is small in the wavelength dependency of diffraction efficiency and is therefore effective for an optical system used in a wide band like the visible light area. Also, while in the present embodiment, only the main structure of the diffracting optical element according to the present invention has been shown and therefore, as shown in FIG. 8, each relief pattern is provided on a flat surface, this is not restrictive, but it can also be applied onto a curved surface or the like.

Also, while in the diffracting optical element according to the present embodiment, a material layer 131 in which no grating is formed is present between the relief pattern 125 of the second material layer 128 and the air layer 127, it is desirable that the thickness L1 be as small as possible.

(Embodiment 3)

Figure 16A:
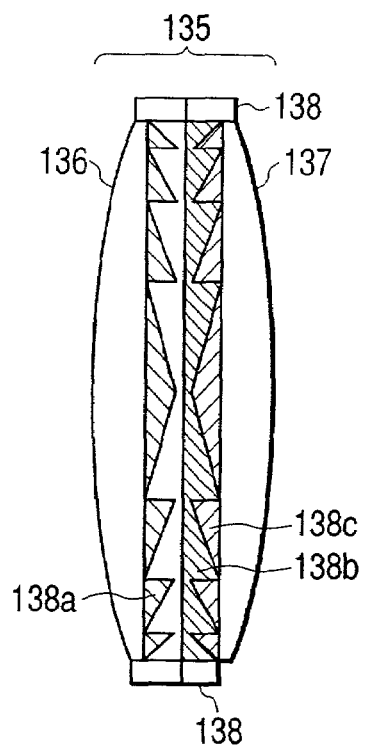
FIGS. 16A and 16B show a diffracting optical element according to Embodiment 3.
Figure 16B:
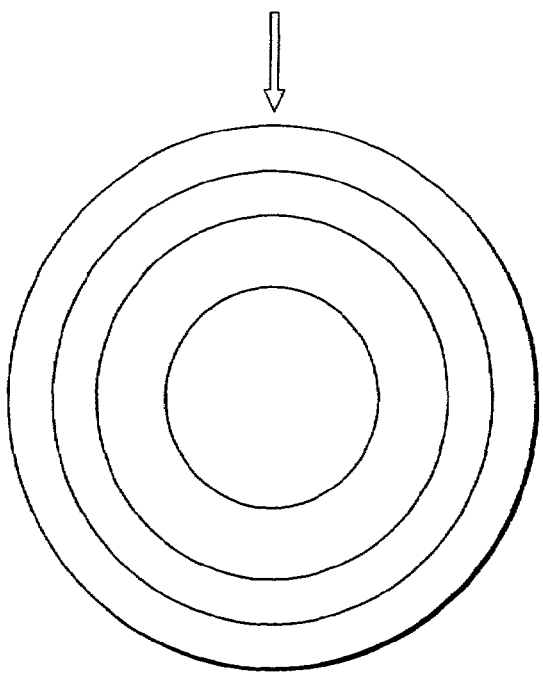

A diffracting optical element 135 according to Embodiment 3 of the present invention is an example in which a plurality of layers of relief pattern is formed between the opposed surfaces of lenses 136 and 137 as substrates, and FIG. 16A is a cross-sectional view thereof, and FIG. 16B is a front view thereof. The relief pattern of the diffracting optical element 135 is enlargedly shown so as to make it easily understood in the figures.

The reference characters 138a, 138b and 138c designate constructions corresponding to the material layers of three-layer structure in Embodiment 1 or Embodiment 2.

The reference numeral 138 denotes a member for determining the spacing between the material layer 138a and the material layers 138b, 138c, and it is provided on the outer peripheral portion (the outside of the effective diameter) of the diffracting optical element 135. As described above, a diffracting portion is formed between the opposed surfaces of the two lenses, whereby there is obtained the effect that the relief pattern and the boundary surface are protected. Further, while in the present embodiment, each relief pattern is formed on a flat surface, this is not restrictive, but it may be formed on a curved surface. Furthermore, while in the present embodiment, the relief patterns are shown as being substantially rotation-symmetrical, this is not restrictive.

Further, while in the above-described embodiments, there has been shown a diffracting optical element having in the visible light area two wavelengths satisfying $$(OPD/\lambda)-m=0\ (m=1, 2, 3, \ldots)$$

when the design order (absolute value) of diffraction is defined as m and the maximum optical path length occurring to a ray of wavelength λ to be diffracted is defined OPD, a construction having in the visible light area three or more wavelengths satisfying this condition may also be adopted depending on the combination of materials forming the respective material layers.

Also, while in Embodiments 1 to 3, attention has been paid only to the refractive indices of the materials forming the diffracting optical element and the phase difference occurring due to the relief structure, it will be effective if reflection preventing means such as coating is formed with the Fresnel reflection of the interface between the air layer and the relief pattern or the interface between the optical materials or the like taken into account, but the characteristic of diffraction efficiency is determined by the construction of the present invention and therefore, a similar effect is obtained. Also, coating may be done with the close contact property between the resin materials or the close contact property with the substrate taken into account. In this case, a coating is present between the interfaces, but this construction does not restrict the present invention.

(Embodiment 4)

Figure 17:
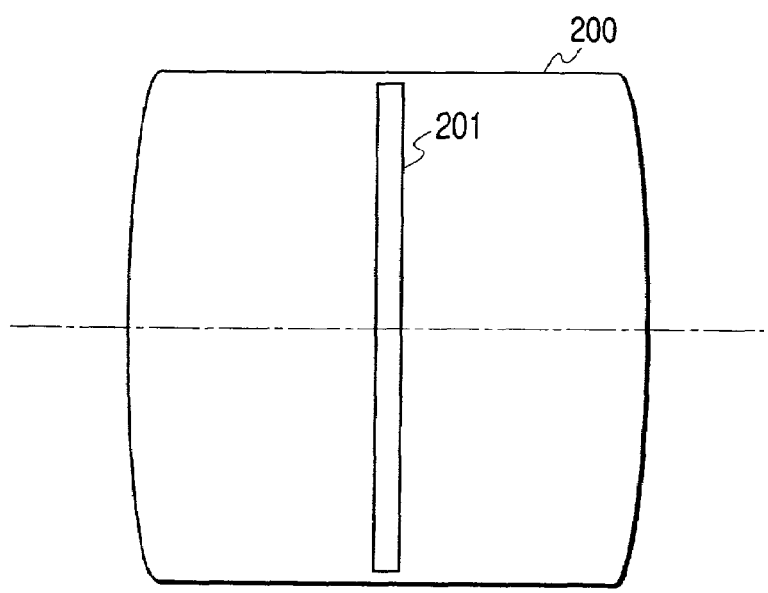
FIG. 17 is a schematic view of an optical system provided with a diffracting optical element.

FIG. 17 schematically shows the construction of an optical system 200 having the diffracting optical element 201 described in Embodiments 1 to 3. The diffracting optical element according to the above-described described embodiments can make the diffraction efficiency of the diffracted light of the design order high in the entire wavelength area used and therefore, can display good optical performance in an optical system using white light.

(Embodiment 5)

Figure 18:
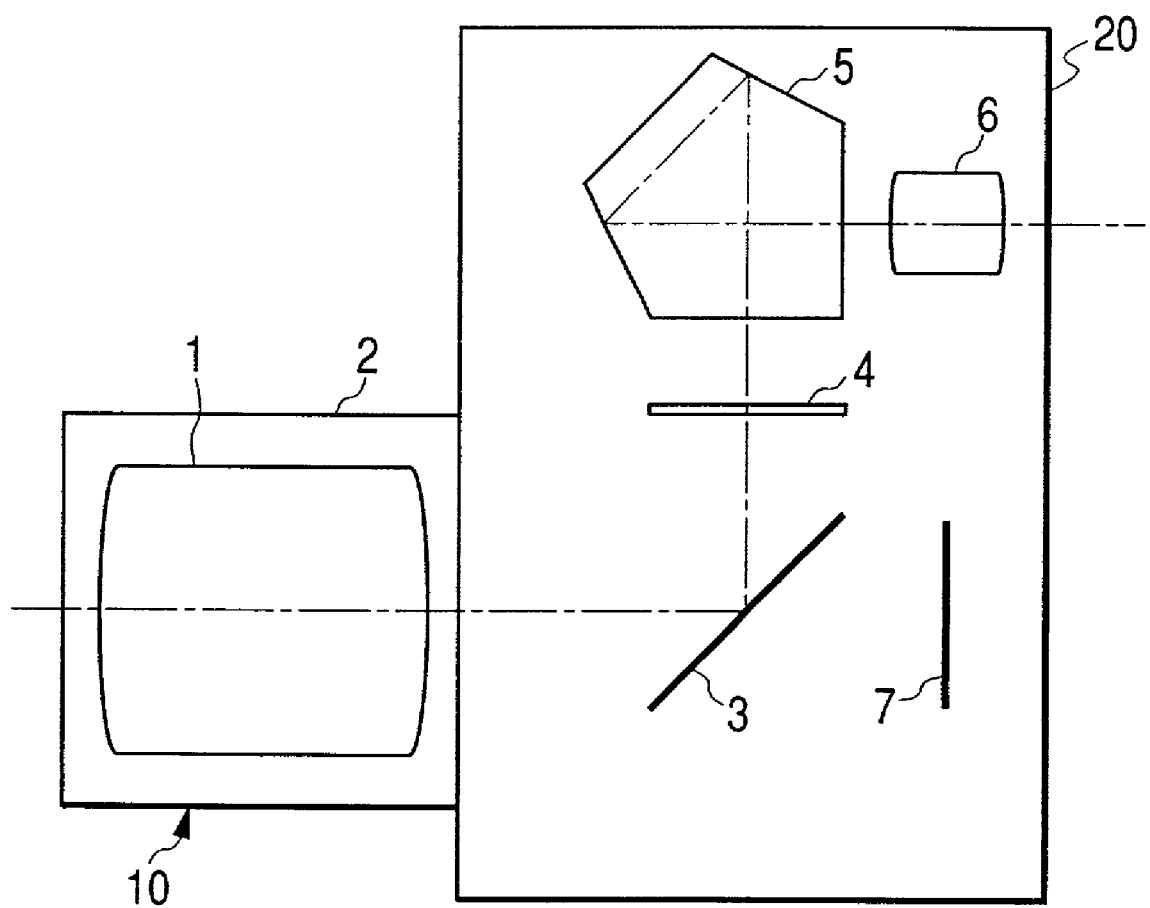
FIG. 18 is a schematic view of an optical apparatus provided with a diffracting optical element.

FIG. 18 is a schematic view of the essential portions of a single-lens reflex camera. In FIG. 18, the reference numeral 10 designates a photo-taking lens, and the reference numeral 20 denotes the main body of a camera, and the photo-taking lens 10 is detachably mountable on the main body 20 of the camera. The photo-taking lens 10 is of a construction which holds a photo-taking optical system 1 by a lens barrel 2. The main body 20 of the camera is comprised of a quick return mirror 3 for upwardly reflecting a beam from the phototaking lens 10, a focusing plate 4 disposed at the image forming position of the photo-taking lens 10, a pentagonal prism 5 for converting an inverted image formed on the focusing plate 4 into an erect image, an eyepiece 6 for observing the erect image therethrough, etc. The reference numeral 7 designates a photosensitive surface on which is disposed the light receiving surface of a solid state image pickup element (photoelectric conversion element) such as a CCD or a CMOS, or silver halide film or the like. During photographing, the quick return mirror 3 is retracted from an optical path, and an image is formed on the photosensitive surface 7 by the photo-taking lens 10.

The diffracting optical element described in Embodiments 1 to 3 can be provided at any position in the photo-taking optical system or in a finder optical system. As described above, the diffracting optical element of the present invention is used in the optical system of an optical apparatus such as a camera, whereby the optical performance of the optical apparatus can be improved.

By applying the construction described in the foregoing embodiments to a laminated type diffracting optical element, the absolute values of the heights of relief patterns, for example, in at least two layers are made equal to each other and the directions of the relief patterns are made opposite to each other, whereby the layers equal in height can be brought into close contact with or made proximate to each other, and the layer in which the vertical surface (grating side) or the like of the relief pattern contacts with the air can be decreased.

Also, the layers equal in the height of the relief pattern are disposed in close contact with or in proximity to each other, whereby it becomes possible to form a surface having no relief pattern and thus, there can be formed a diffracting optical element simple in construction and easy to manufacture.

Also, relative to the height of the relief patterns of the two layers equal in the height of the relief pattern, the height of the relief pattern of other layer is made small, whereby the height of the diffracting optical element can be made small.

Also, design is made such that an air layer is present between the surface having no relief pattern and the aforementioned other layer made small in the height of the relief pattern, whereby the protection of the relief patterns of the diffracting optical element becomes possible and further, the selection range of the optical materials can be widened.

Also, the optical color dispersion in the aforementioned other layer made small in the height of the relief pattern is made greater than that in the two layers equal in the absolute value of the height of the relief patterns and further, design is made such that in this other layer and one of the two layers equal in the absolute value of the height of the relief patterns which is made smaller in the optical color dispersion, the shape of the grating in the cross section thereof becomes small in height with respect to the same direction and light is diffracted in the same direction for a predetermined wavelength, whereby it becomes possible to reduce the wavelength dependency of diffraction efficiency.

Also, by constructing an optical element having a relief pattern between two opposed surfaces, it becomes possible to adopt a construction for protecting the relief patterns of the diffracting optical element. Further, by constructing an optical system having such optical element, it is possible to realize an optical system which is very compact and good in performance owing to the chromatic aberration correcting effect or the aspherical surface effect of the diffracting optical element.

What is claimed is:

1. A diffracting optical element in which a plurality of layers having a periodic relief pattern varying in height in a period are laminated in proximity to or in close contact with each other, comprising:
   a first layer, a relief pattern thereof being formed on a boundary with an air layer;
   a second layer, positioned in proximity to said first layer through the air layer without contacting said first layer; and
   a third layer, a maximum height of the relief pattern of said third layer being different from that of said first layer and equal to that of said second layer, and a direction of said third layer in which the height of the relief pattern varies in a period is equal to that of said first layer and opposed to that of said second layer;
   wherein material forming said first, second and third layers differ in dispersion from one another; and
   difference between maximum optical path lengths of light transmitting through said diffracting optical element is an integer multiple with wavelengths in a visible region.

2. A diffracting optical element according to claim 1, wherein said second and third layers are disposed in proximity to or close contact with each other, and the surface of said second and third layers which is adjacent to said first layer has no relief pattern.

3. A diffracting optical element according to claim 1, wherein said second and third layers are disposed in proximity to or close contact with each other, and the height of the relief pattern of said first layer is smaller than the height of the relief patterns of said second and third layers.

4. A diffracting optical element according to claim 1, wherein said second and third layers are disposed in proximity to or close contact with each other, and the relief pattern of said first layer and one of said second and third layers are opposed to each other with a gap therebetween.

5. A diffracting optical element according to claim 1, wherein said second and third layers are disposed in proximity to or close contact with each other, and the material forming said first layer is greater in dispersion than the materials forming said second and third layers.

6. A diffracting optical element according to claim 1, wherein one of said second and third layers which is formed of a material smaller in dispersion and said first layer vary in height in the same direction.

7. A optical system including a diffracting optical element according to claim 1.

8. A optical apparatus including a diffracting optical element according to claim 1.

9. A diffracting optical element according to claim 1, wherein the periodic relief pattern has a sawtooth shape.

10. A diffracting optical element in which a plurality of layers having a periodic relief pattern varying in height in a period are laminated in proximity to or in close contact with each other, comprising:
    a first layer, a relief pattern thereof being formed on a boundary with an air layer;
    a second layer, positioned in proximity to said first layer through the air layer without contacting said first layer; and
    a third layer, a maximum height of the relief pattern of said third layer being different from that of said first layer and equal to that of said second layer, and a direction of said third layer in which the height of the relief pattern varies in a period is equal to that of said first layer and opposed to that of said second layer;

wherein materials forming said first layer has a dispersion larger than both of materials forming said second and third layers, and the material forming said third layer has the dispersion smaller than the material forming said second layer; and difference between maximum optical path lengths of light transmitting through said diffracting optical element is integer multiple with wavelengths in a visible region.

11. A diffracting optical element according to claim 10, wherein the relief pattern of said first layer and one of said second and third layers are opposed to each other with a gap therebetween.

12. A diffracting optical element according to claim 11, wherein the height of the relief pattern of said first layer is smaller than the height of the relief patterns of said second and third layers.

13. A diffracting optical element according to claim 10, wherein a surface opposite to that surface of one of said second and third layers which has the relief pattern has no relief pattern, and the relief pattern of said first layer and that surface of one of said second and third layers which has no relief pattern are opposed to each other with a gap therebetween.

14. A diffracting optical element according to claim 13, wherein the height of the relief pattern of said first layer is smaller than the height of the relief patterns of said second and third layers.

15. A optical system including a diffracting optical element according to claim 10.

16. A optical apparatus including a diffracting optical element according to claim 10.

17. A diffracting optical element according to claim 10, wherein the periodic relief pattern has a sawtooth shape.

18. A diffracting optical element in which a plurality of layers having a periodic relief pattern varying in height in a period are laminated in proximity to or in close contact with each other, comprising:

a first layer, a relief pattern thereof being formed on a boundary with an air layer;

a second layer, positioned in proximity to said first layer through the air layer without contacting said first layer; and a third layer, a maximum height of the relief pattern of said third layer being different from that of said first layer and equal to that of said second layer, and a direction of said third layer in which the height of the relief pattern varies in a period is equal to that of said first layer and opposed to that of said second layer, material forming said third layer having dispersion different from material forming said second layer, wherein a maximum height of the relief pattern of said first layer is smaller than a maximum height of the relief patterns of said second and third layers; and difference between maximum optical path lengths of light transmitting through said diffracting optical element is integer multiple with wavelengths in a visible region.

19. A diffracting optical element according to claim 18, wherein one of said second and third layers which is formed of a material smaller in dispersion and said first layer vary in height in the same direction.

* * * * *